(No Model.)
R. G. PING.
FEED TROUGH.
No. 349,519. Patented Sept. 21, 1886.
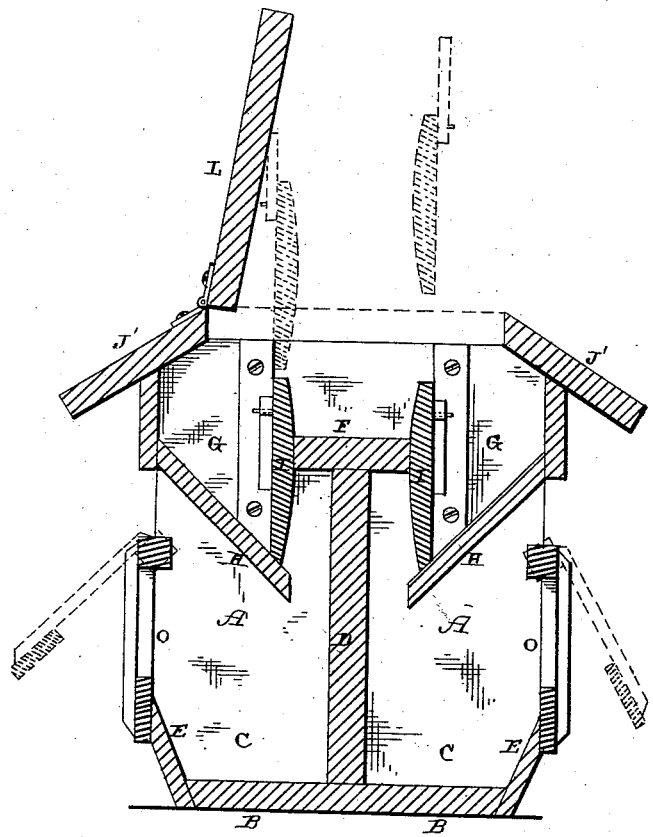

UNITED STATES PATENT OFFICE.

ROBERT G. PING, OF AUDUBON, IOWA.

FEED-TROUGH.

SPECIFICATION forming part of Letters Patent No. 349,519, dated September 21, 1886.

Application filed July 13, 1886. Serial No. 207,890. (No model.)

*To all whom it may concern:*

Be it known that I, ROBERT G. PING, of Audubon, in the county of Audubon and State of Iowa, have invented certain new and useful Improvements in Feed-Troughs; and I do hereby declare the following to be a full, clear, and exact description of the invention, such as will enable others skilled in the art to which it pertains to make and use it, reference being had to the accompanying drawing, which forms part of this specification.

My invention relates to an improvement in feed-troughs; and it consists in, first, the combination of the frame, which is provided with mixing-troughs in its upper portion, removable boards, which form the inner sides of these troughs, and a walk placed between the troughs to enable the operator to move back and forth in them; second, in the arrangement and combination of parts, which will be more fully described hereinafter.

The accompanying drawing represents a vertical cross-section of a device embodying my invention.

A represents the end pieces of the frame, which extend upward a suitable distance; and B, the floor, to which the end pieces are secured. The frame is divided into two feeding-troughs, C, by means of the vertical partition D, which extends from one end of the frame to the other. This partition serves to separate the feeding-troughs, so that the animals upon one side cannot have access to the feed of those upon the other. To the outer edges of the floor are secured the pieces E, which form the outer sides of the feeding-troughs, so as to prevent the feed which is poured into them from running upon the ground.

In the center of the upper portion of the frame is secured the horizontal board F, upon which the person feeding the hogs moves back and forth between the troughs G upon each side, for the purpose of emptying the feed into the troughs, and then properly mixing or distributing it. The troughs G upon each side of the walk F are made with slanting bottoms H, and the inner sides of the troughs are formed by the vertical removable boards I. As long as the boards are in position, the feed that is poured into the troughs remains suspended above the feeding-troughs; but when these boards are raised upward the whole or a portion of the feed at once runs evenly into the feeding-troughs below, where it automatically distributes itself, so that each animal will get only its proper share.

The animals are prevented from getting into the troughs by the hinged gates O, which allow the hogs to insert their heads into the troughs, but which prevent them from moving about while eating. These gates can be raised freely upward, in order to allow the eating-troughs to be thoroughly cleaned out.

Secured upon the top of the frame-work are the two overhanging boards J', which form a roof to prevent the rain from getting into the feeding-troughs. Hinged between these two portions of the roof is the door L, which is thrown backward to allow the operator to move freely back and forth between the troughs, and which is then closed to keep out the water.

This device may be constructed in short sections, which will be placed end to end, in order to divide the different troughs from each other, and thus enable different sets of animals to be fed at the same time without interfering with each other. This is specially desirable where it is necessary to feed young or sick animals separate from the others, and where it is desired to feed different kinds of food.

Having thus described my invention, I claim—

1. The combination of the two mixing-troughs in the upper portion of the frame, the removable side pieces, the walk located between the two troughs, and the two feeding-troughs in the lower portion of the frame, substantially as described.

2. In a feeding device, the combination of the feeding-troughs, the hinged gates connected to opposite sides of the frame, the longitudinal vertical partition which separates the two feeding-troughs from each other, the two mixing-troughs in the upper portion of the frame, the removable side pieces, and the walk which is located in between the two mixing-troughs, substantially as set forth.

In testimony whereof I affix my signature in presence of two witnesses.

ROBERT G. PING.

Witnesses:
THOMAS A. TETER,
H. W. HANNA.